United States Patent [19]

Peltier, Jr. et al.

[11] Patent Number: 5,575,928
[45] Date of Patent: Nov. 19, 1996

[54] PROCESS AND PRODUCT PRODUCED THEREBY FOR DISINFECTION AND AGRICULTURAL REUSE OF ORGANIC SLUDGES

[76] Inventors: Morris Peltier, Jr., 1140 Honeycomb Dr., Cade, La. 70519; Eddie P. Mayeux, Jr., 125 Walker Gravel Pit Rd., Dry Prong, La. 71423

[21] Appl. No.: 341,801

[22] Filed: Nov. 18, 1994

[51] Int. Cl.$^6$ .............................. C02F 1/50; C02F 11/00
[52] U.S. Cl. .............................. 210/764; 422/28; 422/32
[58] Field of Search .............................. 210/764; 422/28, 422/32; 71/11, 12, 13, 14, 23, 24, 25

[56] References Cited

U.S. PATENT DOCUMENTS

| | | | |
|---|---|---|---|
| 3,942,970 | 3/1976 | O'Donnell | 71/12 |
| 4,067,896 | 1/1978 | Pierce | 424/302 |
| 4,729,831 | 3/1988 | Fujino | 210/631 |
| 4,732,684 | 3/1988 | Fujino | 210/631 |
| 4,935,447 | 6/1990 | Philips et al. | 514/640 |
| 5,077,314 | 12/1991 | Philips et al. | 514/640 |

*Primary Examiner*—Neil McCarthy
*Attorney, Agent, or Firm*—Onebane, Bernard, Torian, Diaz, McNamara & Abell Law Firm

[57] ABSTRACT

There is disclosed a process and product made by said process, for conversion of organic waste sludges bearing potentially pathogenic bacteria into a non-odoriferous, non-pathogenic agricultural medium which is highly nutritious to plant life; which process includes: blending the organic sludge with an effective amount of at least one of a class of chemical compounds which form methyl isothiocyanate ("MITC") in aqueous solution, such as sodium N-methyldithiocarbamate; blending the MITC treated sludge with an effective amount of electrolytic soil additive; blending the MITC and soil conditioner treated sludge with an effective amount of a hydrophilic polymer, such as potassium polyacrylate; and, blending the MITC, soil electrolytic additive, hydrophilic polymer treated sludge with organic bulking agents and inorganic conditioning materials.

22 Claims, No Drawings

PROCESS AND PRODUCT PRODUCED THEREBY FOR DISINFECTION AND AGRICULTURAL REUSE OF ORGANIC SLUDGES

BACKGROUND OF THE INVENTION

1. Field of Invention

The invention disclosed herein relates generally to the field of treating organic waste sludges to reduce and/or remove viable pathogens and/or vector attraction, so that such sludges may be safely and beneficially reused. More particularly the invention disclosed herein relates to conversion of said sludges, which are inherently highly nutritious to plants, into a safe, enriched agricultural medium. With more particularity the invention relates to conversion of the sludge into a form that is convenient to use, and is conditioned to improve the ability of plants to extract nutrients from the rich organic materials included therein.

2. Description of Prior Art

Organic waste sludges presently constitute a substantial problem in many areas of the world. Such wastes are by-products of municipal and private waste treatment plants, feed lot operations, sawmills, paper mills and many other industrial operations.

A problem with such organic sludges is that they provide an excellent growth medium for many types of potentially pathogenic bacteria, which are almost inevitably introduced into said sludges by the influent waste. Accordingly, raw organic sludges can be dangerous to human, animal and plant life, and proper disposal or reuse of them constitutes a substantial problem.

Said sludges are also typically odoriferous, have substantial vector (pests, such as rats, mice, roaches and some birds) attraction, and exist in the form of a sticky, wet, cohesive mass. These characteristics substantially limit where such sludges may be acceptably disposed, make dispersion difficult and entail the risk of vectors widely dispersing any pathogens remaining in the sludge.

However, the nutritious properties of organic sludge which cause potentially pathogenic organisms to flourish, also provide a potentially highly beneficial use for said sludge, as an agricultural enriching medium, provided that the potentially pathogenic organisms, vector attraction and difficult handling characteristics can be significantly improved.

A number of methods, described in 40 CFR Part 257, are known to reduce pathogens. These include aerobic digestion, anaerobic digestion, lime stabilization, air drying, composting, heat drying, heat treatment, gamma irradiation, electron irradiation and the methods shown on Table 6-1 of said regulation. In addition thereto U.S. Pat. Nos. 5,281,341 and 4,793,927 to Reimer's disclosed methods for treating waste sludge with nitrous acid or ammonia. All of the previously known methods involve one or more of the following disadvantages:

a) substantial time of treatment, b) high energy usage, c) substantial use of complex and expensive equipment, and, d) transport of pathogen bearing sludges to a permanently located treating facility.

The invention disclosed herein substantially reduces these disadvantages by providing a fast, simple, inexpensive method of treating organic wastes, on site, with simple, portable equipment. The invention further teaches recycling of the treated sludge into an agricultural medium of highly beneficial characteristics.

3. Objects of the Invention

The principal object of the invention is to provide a process by which organic waste sludges can be quickly and cheaply treated to remove and/or reduce potentially pathogenic bacteria, and eliminate or reduce vector attraction. Another object of the invention is to provide a highly beneficial product and process for making said product, which effectively makes said treated sludge recyclable as an agricultural medium and/or soil enriching/conditioning agent.

4. Description of the Preferred Embodiment

The preferred embodiment of the invention includes a first step of disinfecting an organic waste sludge possibly harboring pathogenic bacteria, then processing the disinfected sludge in a series of steps designed to improve both the handling characteristics of the end product and the ability of plants to extract nutrients from the end product, thereby creating an end product highly suitable for use as an agricultural medium and/or soil enriching/conditioning agent.

In the disinfecting step of the process the organic sludge is thoroughly mixed with an aqueous solution of a salt that will produce methyl isothiocyanate ("MITC"). One such salt, sodium N-methyldithiocarbamate ("SNMDC"), commonly used as a soil fumigant for control of weeds, parasitic nematodes, and fungi, is both economical and effective. Other alkali metal salts of monoakyldethiocarbamate salts of any cation, such as sodium, potassium, lithium, or cesium, or heavier metals may also be used but may be more expensive to manufacture. Alkaline earth metal salts, such as magnesium, calcium, strontium, etc., of monomethyldithiocarbamate or monoakyldethiocarbamate could also be used. Regardless of which salt of monomethyldithiocarbamate or monoakyldethiocarbamate is employed, the active biocide generated is MITC. MITC reacts with primary or secondary amine groups on biologically important molecules, such as enzymes, to form thioureas, thereby altering said molecules so that they can no longer perform their biochemical function. Since MITC reacts with a wide variety of biomolecules, it forms an effective biocide for known pathogenic bacteria found in organic waste sludge.

While dosage may vary according to the MITC releasing agent used, temperature, moisture content and bacterial contamination of the sludge, we have found that a thorough mixing of 8 fluid ounces of SNMDC per ton of sludge was effective in exterminating known bacterial pathogens in a sample of municipal waste sludge. In addition to disinfecting said sludges of pathogenic bacteria, the aforesaid step substantially reduces the odoriferous characteristics and vector attraction of said sludge.

After disinfection as aforesaid, the sludge may be treated with a water based, biodegradable, electrolytic soil additive, such as "Agri-SC Soil Treatment" by Four Star Services, Inc. into the admixture, at the rate of 4–12 liquid ounces per ton of sludge. Such additive has two beneficial effects. First, its wetting properties insure penetration of water, bearing MITC, in and between the particulate matter of the sludge, thereby increasing the probability of contact with all pathogenic bacteria that may be harboring therein, thereby increasing the probability of complete disinfection. Secondly, inclusion of such electrolytic additive in the end product results in an improved agricultural product breaking hydrocopic rings which exist around colloidals included therein, improving the ability of plants to extract nutrients therefrom.

The third step is adding hydrophilic polymer, such as potassium polyacrylate, may be introduced into the disinfected admixture. Said polymer absorbs excess water from the sludge, effectively "drying" same, so as to make it less cohesive and easier to handle. The addition of polymer also improves the water retention characteristic of the admixture, which produces a number of desirable effects. First, improved water retention characteristics reduce the ability of odoriferous molecules to escape from mixture, further reducing odor and vector attraction. Secondly, increased water absorption provides for increased retention time of MITC dissolved therein, thereby providing an increased period of contact between MITC and pathogenic bacteria. Finally, increased water retention, and reduced evaporation, improve the characteristics of the end product as an agricultural medium and/or soil conditioning agent. Mixing of approximately 2 pounds of powdered potassium polyacrylate per ton has been found effective for sludges bearing approximately 80% water content. Dosage may, however, be varied depending on the absorbency of the particular hydrophilic polymer chosen. Any amount of hydrophilic polymer may be added to produce a desired amount of "drying" of the sludge, and desired water retention characteristics of the end product.

A final, also optional, step in making an easily usable agricultural medium, is the inclusion of bulk, non-pathogenic organic and/or non-organic conditioning material. An almost endless variety of such materials may be used, to bind the highly enriched organic sludge to particulate matter which tends to remain in place, and to impart desired soil conditioning characteristics to the end product. Common additions may include seed husks, hulls, shells, sawdust, ground animal shell and bones, boiler ash, crop stubble, leaves, hay, grass, charcoal, carbon black, diatomaceous earth and other organic matter. Conditioning agents such as sand, mica, vermiculite, limestone and the like may also be used, according to the conditioning properties desired in the end product. Once these materials are blended with the sludge, (especially sewer sludge) the cohesive texture of the sludge is further reduced and the end product has the consistency of a potting soil type texture. This makes it much easier to apply to or in the soil with the existing, simple, conventional application equipment of the agricultural industry.

In one test approximately 1400 lbs of sludge was treated and thoroughly mixed with approximately 2800 lbs of sawdust. The end product was a dark, finely divided, non-cohesive, powder having a slight smell of freshly tilled earth, which was found free of pathogenic bacteria.

Further testing of said process is undergoing for extermination of helminth ova and enteric viruses, and though no claim is yet made respecting these potential pathogens, the process is expected to substantially reduce, if not eliminate both as viable pathogens. If not, a step of treatment with ammonia, also known to be beneficial to plants, may be included in the process.

The above-described preferred embodiment should be interpreted as illustrative and not in any sense of limiting the scope of the invention, which is set forth by the following claims and their equivalents.

What is claimed is:

1. A process for exterminating pathogenic bacteria in organic waste sludge comprising the step of thoroughly mixing said organic waste sludge with an effective amount of an aqueous based solution having a solute of at least one of a group of chemical salts, which said salt spontaneously releases gaseous methyl isothiocyanate when said salt is dissolved in an aqueous based solution.

2. The method of claim 1 wherein the group of chemical salts which spontaneously release gaseous methyl isothiocyanate when said chemical compound is dissolved in an aqueous based solution comprises at least one of a group of monomethyldithiocarbamate salts of any cation.

3. The method of claim 2 wherein the monomethyldithiocarbamate salt used comprises at least one having a metal cation.

4. The method of claim 3 wherein the monomethyldithiocarbamate salt used comprises at least one of a group of salts having sodium as a cation.

5. The method of claim 4 wherein the monomethyldithiocarbamate salt having a sodium cation comprises sodium N-methyldithiocarbamate.

6. The method of claim 3 wherein the monomethyldithiocarbamate salt used comprises at least one having a potassium cation.

7. The method of claim 6 wherein the monomethyldithiocarbamate salt having a potassium cation comprises potassium N-methyldithiocarbamate.

8. The method of claim 1 wherein the group of chemical salts which spontaneously release gaseous methyl isothiocyanate in gaseous form when said chemical compound is dissolved in an aqueous based solution comprises at least one of a group of monoalkyldithiocarbamate salts of any cation.

9. The method of claim 1 wherein the amount of chemical salts which spontaneously release gaseous methyl isothiocyanate in gaseous form when said chemical compound is dissolved in an aqueous based solution is at least 8 fluid ounces per ton of organic sludge.

10. The method of claim 1 further comprising the step of thoroughly mixing an effective amount of water based, biodegradable, electrolytic soil additive with the organic sludge.

11. The method of claim 1 further comprising the step of thoroughly mixing an effective amount of hydrophilic polymer with the organic sludge.

12. The process of claim 1 further comprising the step of thoroughly mixing an effective amount of at least one of a group of non-pathogenic, organic bulking material.

13. The process of claim 1 further comprising the step of thoroughly mixing an effective amount of at least one of a group of non-pathogenic, non-organic soil conditioning agents.

14. The process of claim 10 further comprising the step of thoroughly mixing an effective amount of hydrophilic polymer with the organic sludge.

15. The process of claim 10 further comprising the step of thoroughly mixing an effective amount of at least one of a group of non-pathogenic, organic bulking material.

16. The process of claim 10 further comprising the step of thoroughly mixing an effective amount of at least one of a group of non-pathogenic, non-organic soil conditioning agents.

17. The process of claim 14 further comprising the step of thoroughly mixing an effective amount of at least one of a group of non-pathogenic, organic bulking material.

18. The process of claim 14 further comprising the step of thoroughly mixing an effective amount of at least one of a group of non-pathogenic, non-organic soil conditioning agents.

19. The process of claim 17 further comprising the step of thoroughly mixing an effective amount of at least one of a group of non-pathogenic, non-organic soil conditioning agents.

20. The method of claim 10 wherein the effective amount of water based, biodegradable, electrolytic soil additive is approximately 4 to 12 fluid ounces per ton of organic sludge.

21. The process of claim 11 or 14 wherein the effective amount of hydrophilic polymer is approximately 1–3 pounds per ton of organic sludge.

22. The method of claim 12, 15 or 17 wherein the effective amount of non-pathogenic, organic bulking material is approximately 1 to 3 times the volume of the organic sludge.

* * * * *